Figure 1:
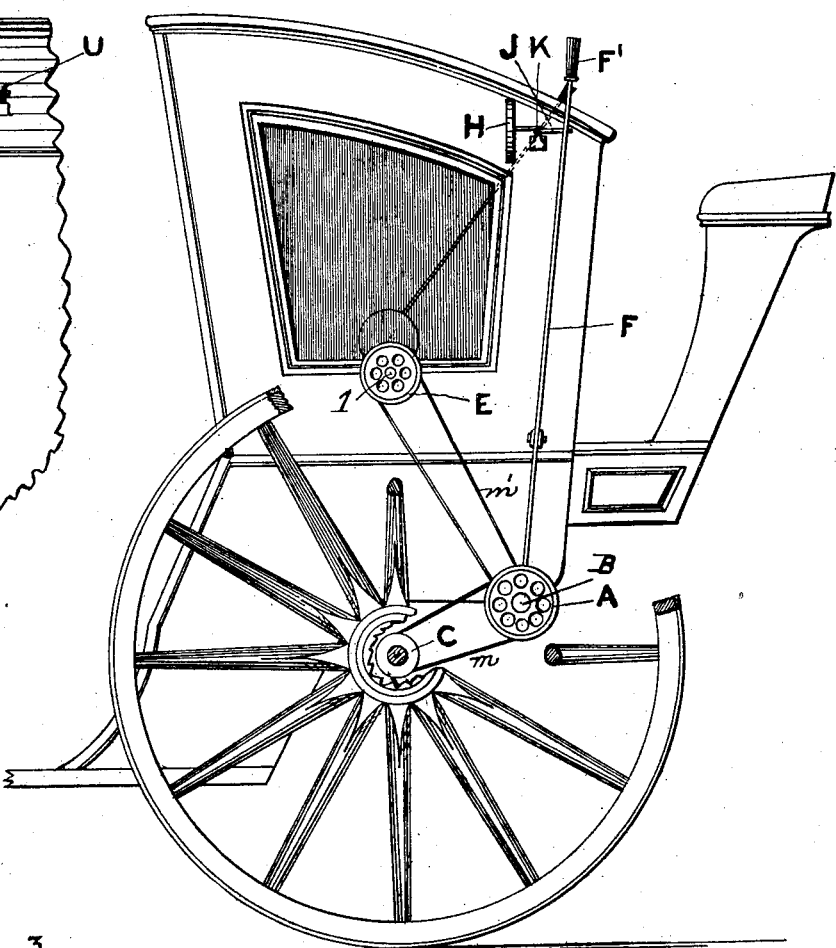

(No Model.) 2 Sheets—Sheet 1.

G. B. SMITH.
DISTANCE INDICATOR FOR CABS, &c.

No. 357,420. Patented Feb. 8, 1887.

Witnesses:
W. R. Haight
W. E. Bowen

Inventor:
George Bond Smith,
by W. H. Babcock
attorney (No Model.) 2 Sheets—Sheet 2.
G. B. SMITH.
DISTANCE INDICATOR FOR CABS, &c.
No. 357,420. Patented Feb. 8, 1887.
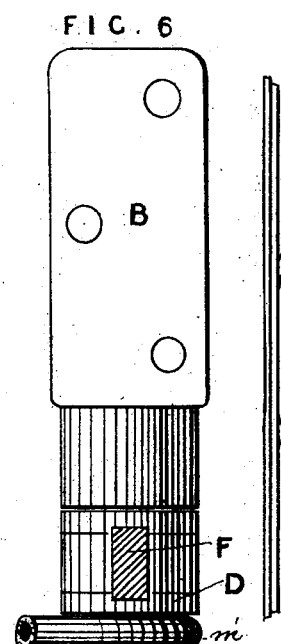
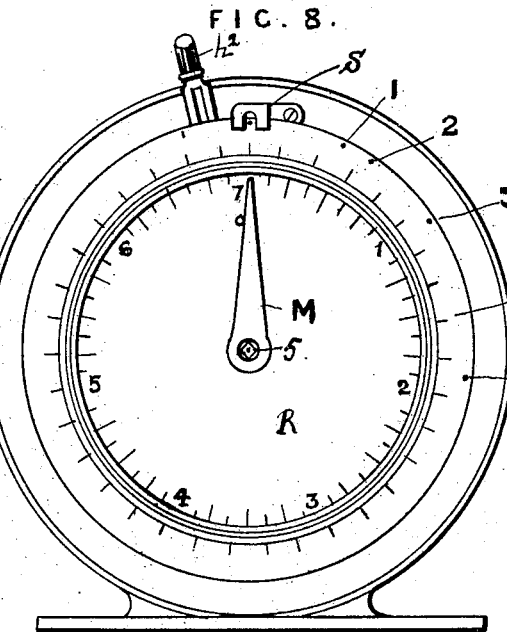
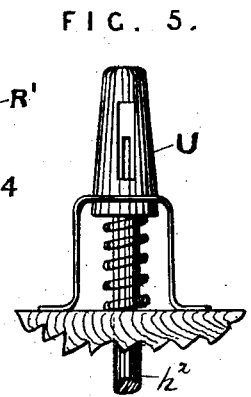
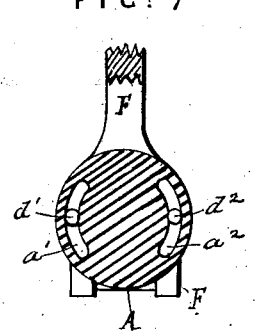
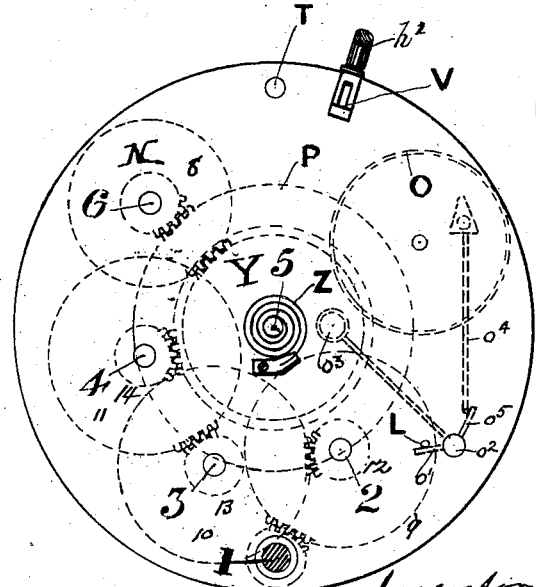
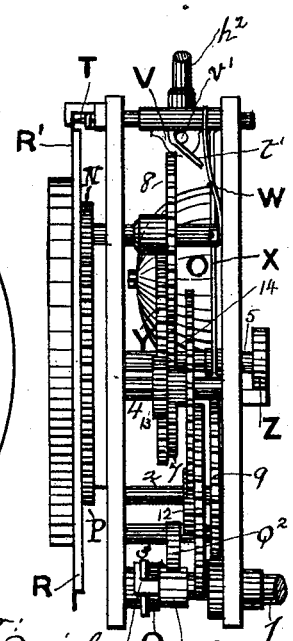
Witnesses:
W. R. Haight
W. E. Bowen
Inventor:
George Bond Smith,
by W. H. Babcock
Attorney.

UNITED STATES PATENT OFFICE.

GEORGE BOND SMITH, OF HANDSWORTH, COUNTY OF STAFFORD, ENGLAND.

DISTANCE-INDICATOR FOR CABS, &c.

SPECIFICATION forming part of Letters Patent No. 357,420, dated February 8, 1887.

Application filed June 22, 1886. Serial No. 205,942. (No model.) Patented in England January 15, 1886, No. 656.

*To all whom it may concern:*

Be it known that I, GEORGE BOND SMITH, of Handsworth, in the county of Stafford, England, engineer, and a subject of the Queen of Great Britain, have invented certain new and useful Distance-Indicators for Cabs and other Vehicles, (for which I have obtained Letters Patent in England, No. 656, dated January 15, 1886;) and I do hereby declare that the following is a sufficient description of the invention to enable those skilled in the art to which it appertains to carry the same into practical effect.

This invention has for its object a new or improved distance-indicator for cabs and other vehicles, by which the distance traveled is distinctly indicated to the passenger, with the fare for that distance, and at the same time the total number of fares taken in the day and total distance traveled are also indicated on a second index. This has been a want for many years, as cab proprietors have had practically no check upon the driver as to the total amount of work done.

I carry out my invention as follows: I place in any convenient position, inside the cab or other part easily accessible, an indicator similar to the works of a clock, and having one main or driving shaft projecting outside the cab from the outer part of the clock-work. This shaft is driven from the hub of the cab-wheel by chain-gear working upon flanged pulleys, which are faced with india-rubber or other soft material. The first chain, driving from the hub in a horizontal direction, is kept in a regular tension by a roller and spring-arm issuing from the under part or side of the cab-body, so that the action of the cab-springs does not materially interfere with the certain driving action of the chain. In this manner and through a series of tooth-wheels the speed is reduced to the main shaft in the indicator. The indicating-dial is fixed at the center of the clock-work, the shaft being driven by reducing wheels and pinions from the main side shaft. The center shaft projects through the back and front plates, carrying a finger at the inside, by which the distance of each fare is shown on a suitable center dial. The opposite end or other part of this spindle carries a spring, which winds as the spindle moves, and the spindle is capable of moving endwise by the depression of a lever by the driver, which throws it out of gear with the train and immediately returns the hand to zero, when the spindle is automatically replaced in gear by a second spring. Now, this center shaft drives a secondary shaft nearer the outside of the clock-work, upon which is fixed a pinion at its outside end. Around the outside of the passenger-index is a casing or other arrangement, upon which a sleeve or ring plate is placed to revolve easily, and this ring carries a tooth-wheel at its back, gearing into the pinion immediately aforesaid, and is therefore revolved with the center shaft, only much slower. Now, upon this sleeve or ring plate I place a movable paper or other index so divided as to be capable of indexing the very largest day's work or other period of work. Now, just behind the zero-point of this index is a sliding bar or pricker, which moves horizontally and pricks a hole in the larger or proprietor's index every time a fare is concluded, and by the same action the lever, which returns the passenger-hand to zero, and thus the length of every journey and every fare and the total distance run are all indexed and cannot be reached by the driver, as the whole is inclosed and locked up, the key being kept by an authorized person, who changes the proprietor's index each day. A little hinged clip turns down upon the paper index for the purpose of holding it while the pricker pierces it.

The lever for throwing the center shaft out of gear and piercing the index is hinged to one plate and works in a slot in the other, and carries a projecting pin, which lies against a corresponding pin in the pricker-bar, and thus as the lever is depressed by the cabman or driver the action is quite easy. The pricker-bar carries an arm with a forked or other end down to the center shaft, which moves that endwise, and thus both actions must take place together by movement only.

The driver has a suitable handle near the top or other position, which is the only command he has over the instrument, except that he can throw the apparatus out of gear with the hub of the wheel, which stops indicating when he has no passenger. Connected with this is a board which turns vertically or horizontally, indicating whether the cab is hired or not.

In order that my invention may be clearly understood and more easily carried into practice, I have appended hereunto two sheets of drawings, upon which I have illustrated an example of its application to a hansom-cab, and from which the application may be extended to other descriptions of cabs and to other vehicles of almost any design.

Figure 4:
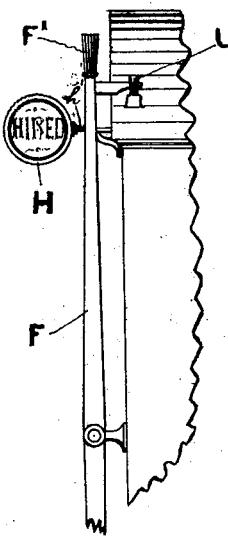
Figure 3:
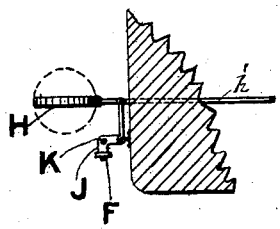
Figure 2:
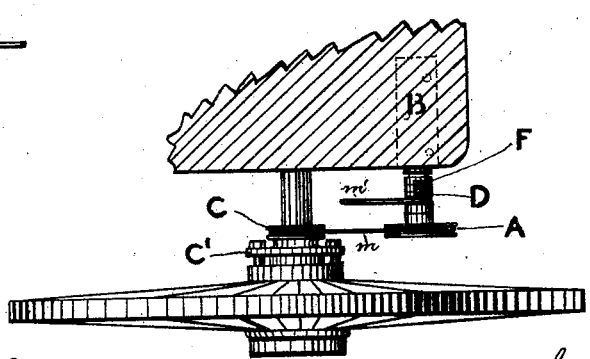

Figure 1 is a side elevation of a hansom-cab with the road-wheel broken away sufficiently to enable the driving-gear to be clearly seen, as will be hereinafter more fully explained. Fig. 2 is a part sectional plan showing the same road-wheel and the mode of securing the pulley A to the fixed under plate-spindle, B. Fig. 3 is a plan of a portion of the mechanism at the top of the cab for bringing the indicators into use. Fig. 4 is a back view of a portion of the same mechanism as shown by Fig. 3. Fig. 5 is a staple fixed on the top of the cab to take the weight of rod and handle U, keeping it always up and bringing it back when thrust down. Fig. 6 is an enlarged view of the fixed under plate, B, with the clutch arrangement for throwing the distance-indicator in and out of gear. Fig. 7 is a sectional elevation on line 1 2, Fig. 6, looking toward the clutch D. Fig. 8 is a front view of the distance-indicator from the inside of the vehicle. Fig. 9 is a back view of the distance-indicator, and Fig. 10 is a side elevation showing the works thereof.

My indicator is worked by the revolving of the road-wheel, and for this purpose I attach to the inside boss of the said wheel the pulley C, which, by preference, is made one with the collar $c'$, which therefore takes the place of the usual lock-collar. From this pulley C, I drive by belt $m$ onto the enlarged pulley A, which runs loose upon the plate-spindle B, which is secured to the under part of the cab in this case; but this spindle may be otherwise fixed; but it is best to keep it in a somewhat horizontal line with the main axle. The sliding clutch D also carries a groove for a band and drives up by belt $m'$ to the pulley E at the back of the distance-indicator, composed of the pointer M and the plate R, having a register-dial marked thereon. By sliding the clutch D along the spindle B, which is accomplished by the driver of the cab operating the handle F' and the shifting-rod F, the teeth $d'$ and $d^2$ on clutch D are engaged in the slots $a'$ and $a^2$ in the boss of pulley A, as shown at Fig. 7, and motion is thus imparted to the distance-indicator at the will of the driver.

While speaking of the driver of the cab and handle F' it is well to explain that the hire-indicator H is also operated by the handle F', so that when the distance-indicator is at work the hire-indicator H shows back and front, one word or sign being on each side, as marked on drawing Fig. 4, the shaft $h'$ of the hire-indicator running through the cab; but when there is no fare in the cab it is turned down, as shown by dotted line, Fig. 3, which is accomplished by the movement of the lever J as the handle F' is moved outward upon its fixed pivot K.

We have now seen how motion is imparted to the pulley E on the main shaft of the distance-indicator, and also how it is started or stopped at the pleasure of the driver. I therefore now come to the clock-work connected with the main spindle 1, which carries the pulley E. The speed from the spindle 1 is rapidly reduced by pinions and gear-wheels through the spindles 2, 3, and 4, which drive the center spindle, 5, carrying the passenger-indicator finger M. Said wheels are marked 9, 10, and 11 and said pinions 12, 13, and 14. The further spindle, 6, is driven from spindle 5 by a pair of wheels. This spindle 6 carries pinion N, Figs. 9 and 10, which drives the wheel P, which is fast with the plate R. The plate R thus revolves much slower than the finger M—say five times slower. Thus, while one revolution of M indicates five miles, one revolution of R would indicate thirty-five miles. Now, upon the plate R an annular index-paper, R', fits, and it is held by the clutch S while the pricker T is brought forward to mark the dial-sheet R'. This marking is effected by a thrust of the driver's hand upon handle U on the end of a shaft or rod, $h^2$, which depresses the shaft $h^2$, carrying the pin $v'$, which works upon the bent wire $t'$ of pricker T, the pricker being brought back by the spring W. The pricker-rod T also carries a rod, X, Fig. 10, extending down to shaft 5, which slides it along in a horizontal direction sufficiently to take wheel Y out of gear when the spring Z carries the finger M back to zero. The dial R' has four journeys indicated thereon—viz., 0 to 1 equal two and one-half miles, 1 to 2 equal three-fourths of a mile, 2 to 3 equal two and one-fourth miles, and 3 to 4 equal four and one-eighth miles, and their collective total is nine and five-eighths miles, as shown on inner edge of annular index. At sixpence a mile the driver would receive for these four journeys six shillings; but the collective total distance of the four only gives five shillings at the same rate, which clearly illustrates the great advantage of this system.

It will thus be seen that when a fare hires the cab the finger M is at zero, and as it would be the driver's loss if he commenced or did any part of the journey without throwing his clutch D, which is also a pulley, into gear, this will be done, and the distance commences to show upon the center dial, which may be arranged for any number of miles. When the fare is settled, the driver throws out the clutch D and presses the handle U, which pricks the proprietor's index-paper R', and the same time the finger M comes back to zero, and this is repeated each journey, the outer index-paper, R', being removed each day, as the face is covered and locked up with a suitable door and is only accessible to an authorized person.

The driving-bands $m\ m'$ may be of india-rubber or other material with a wire or chain running through, so that they cannot be cut, and the pulleys A, E, and D may have shields partially covering them, to prevent the driving-bands being slipped off or on, as the case may be.

The bell or other alarm, O, is fixed in any suitable and convenient position in the apparatus—such, for instance, as that shown. On the gear-wheel 9, carried by shaft 2, is fixed the pin L, which has to carry round the projection $o'$ of the hammer-arbor $o^2$ each revolution thereof before it can pass. This arbor also carries the hammer $o^3$, which is operated and kept up to its work by the spring $o^4$ bearing upon the projection $o^5$. It will thus be seen that each revolution of this wheel 9 will be indicated by one stroke upon the bell or alarm O.

It will be evident that by fixing a number of pins upon any revolving part that would travel, say, one revolution for each mile, special indication could be given—such, for instance, as two rings at the completion of each mile—and the quarters and half miles might likewise be specially indicated; but it may be arranged to throw out of gear, so as to ring the bell or not, at the pleasure of the driver. Upon the spindle 1, inside the clock-work case, is loosely mounted the ratchet-wheel Q, which is fixed to the spindle 1, and in the teeth of which a pawl, $q'$, engages, which is fixed to the spindle itself, thereby propelling the pinion one way; but on reversing the motion of the spindle the pawl slips over the teeth, which are kept stationary by means of the spring $Q^2$ bearing upon the flats $q^3$, formed on a prismatic enlargement of spindle 1.

What I claim, then, is—

1. A rotary plate having a dial marked thereon, and carrying also a detachable index-paper, in combination with a spindle rotating more rapidly than said plate, a pointer carried by said spindle and traveling over said dial, a movable pricker for marking said detachable index-sheet, and gearing whereby said plate and said pointer are actuated, substantially as set forth.

2. In combination with the pointer and dial or index-paper driven at different rates of speed, the pricker for making marks on said dial, a movable gear-wheel on the shaft carrying said finger, a spring for carrying it back to zero when released, and a rod connecting said pricker with said movable gear-wheel to effect such release, substantially as set forth.

In testimony that I claim the foregoing as my own I affix my name in the presence of two witnesses.

GEORGE BOND SMITH.

Witnesses:
GEORGE BARKER,
GEORGE PRICE.